(12) United States Patent
Menjak et al.

(10) Patent No.: US 8,011,265 B2
(45) Date of Patent: Sep. 6, 2011

(54) MODULAR POWER ACTUATOR

(75) Inventors: Ratko Menjak, Frankenmuth, MI (US); Brian J. Magnus, Frankenmuth, MI (US); Steven M. Thomas, Saginaw, MI (US); Thomas A. Barrett, Bridgeport, MI (US); Mohammad S. Islam, Saginaw, MI (US); Karen A. Boswell, Freeland, MI (US); David K. Siniff, Bay City, MI (US); Michael A. Tomasino, Montrose, MI (US); James E. Rouleau, Burt, MI (US); Steven J. Schultz, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 538 days.

(21) Appl. No.: 12/029,270

(22) Filed: Feb. 11, 2008

(65) Prior Publication Data
US 2009/0199667 A1 Aug. 13, 2009

(51) Int. Cl.
*B62D 1/18* (2006.01)
*F16H 1/16* (2006.01)
*F16H 1/20* (2006.01)
(52) U.S. Cl. .......................................... 74/425; 74/493
(58) Field of Classification Search .................. 74/425, 74/493, 494, 495; 403/359.1, 309, 360, 298, 403/3, 4
See application file for complete search history.

(56) References Cited

U.S. PATENT DOCUMENTS

| | | | | |
|---|---|---|---|---|
| 1,663,798 A | * | 3/1928 | Haymond | 128/96.1 |
| 4,893,518 A | * | 1/1990 | Matsumoto et al. | 74/493 |
| 5,178,411 A | * | 1/1993 | Fevre et al. | 280/775 |
| 6,272,942 B1 | | 8/2001 | Ganser | |
| 6,287,042 B1 | * | 9/2001 | Eriksson | 403/267 |
| 6,520,042 B2 | | 2/2003 | Jammer et al. | |
| 6,523,431 B2 | | 2/2003 | Ozsoylu et al. | |
| 6,622,814 B2 | | 9/2003 | Kurokawa et al. | |
| 6,776,064 B2 | | 8/2004 | Bucholz et al. | |
| 6,867,516 B2 | | 3/2005 | Frey et al. | |
| 7,240,762 B2 | | 7/2007 | Shiina et al. | |
| 7,243,569 B2 | | 7/2007 | Takahashi et al. | |
| 2005/0199087 A1 | * | 9/2005 | Li et al. | 74/493 |
| 2008/0231148 A1 | * | 9/2008 | Huang et al. | 310/49 R |

* cited by examiner

*Primary Examiner* — Justin Krause
(74) *Attorney, Agent, or Firm* — Cantor Colburn LLP

(57) ABSTRACT

A power actuator assembly includes a torque transmission device, a motor mounted to the torque transmission device extending along a motor axis, and a screw coupled to the torque transmission device and extending along a screw axis. An adjustment mechanism interconnects the screw and the torque transmission device and permits selective rotational adjustment between the adjustment mechanism and the torque transmission device to rotate the motor relative to the torque transmission device. A connecting device releasably interconnects the adjustment mechanism to the torque transmission device to permit repeated re-positioning of the motor relative to the torque transmission device.

20 Claims, 11 Drawing Sheets

MODULAR POWER ACTUATOR

BACKGROUND OF THE INVENTION

1. Field of the Invention

The subject invention relates to a power actuator assembly, and more specifically to an adjustable steering column assembly having a power actuator for moving the adjustable steering column assembly.

2. Description of the Prior Art

Power actuator assemblies of the type described herein are utilized in several different devices, including an adjustable steering column in a vehicle. The adjustable steering columns may adjust in both a rake (tilt) direction and in a telescoping direction. These adjustable steering columns commonly utilize the power actuator assembly to move the steering column in the rake direction and/or the telescope direction.

Typically, the power actuator assembly comprises a torque transmission device. A motor is mounted to the torque transmission device and extends along a motor axis. The motor includes an output shaft that is rotatable about the motor axis. A screw is rotatably supported by the torque transmission device and extends along a screw axis. The torque transmission device transfers the rotational movement of the output shaft about the motor axis to the screw, to rotate the screw about the screw axis.

The steering column, along with several other devices and related components, must all be positioned within an instrument panel of the vehicle. This is often a very confined area, and requires that the position of the motor of the power actuator assembly be rotationally customized about the screw axis relative to the torque transmission device for each individual vehicle. This results in manufactures having to produce several different versions of the power actuator to fit each different vehicle.

SUMMARY OF THE INVENTION AND ADVANTAGES

The subject invention provides a power actuator assembly. The power actuator assembly comprises a torque transmission device. A motor is mounted to the torque transmission device and extends along a motor axis. The motor includes an output shaft rotatable about the motor axis. A screw is coupled to the torque transmission device and extends along a screw axis. The torque transmission device transfers the rotational movement of the output shaft about the motor axis to the screw to rotate the screw about the screw axis. An adjustment mechanism rotatably supports the screw and interconnects the screw and the torque transmission device. The adjustment mechanism permits selective rotational adjustment of the torque transmission device relative to the adjustment mechanism about the screw axis to reposition the motor relative to the adjustment mechanism.

Accordingly, the subject invention provides a modular power actuator assembly, in which the position of the motor and the torque transmission device relative to the adjustment mechanism is changeable about the screw axis. This permits a single power actuator assembly of the subject invention to be customized to fit the packaging requirement of several different vehicles, thereby eliminating the need to produce different versions of the power actuator assembly for each vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a steering column assembly is shown generally at 20. The steering column assembly 20 incorporates a power actuator assembly 22 therein. While shown in combination with the steering column assembly 20, it should be appreciated that the power actuator assembly 22 of the subject invention may be incorporated into different devices other than the steering column assembly 20 shown and described herein.

Figure 1:
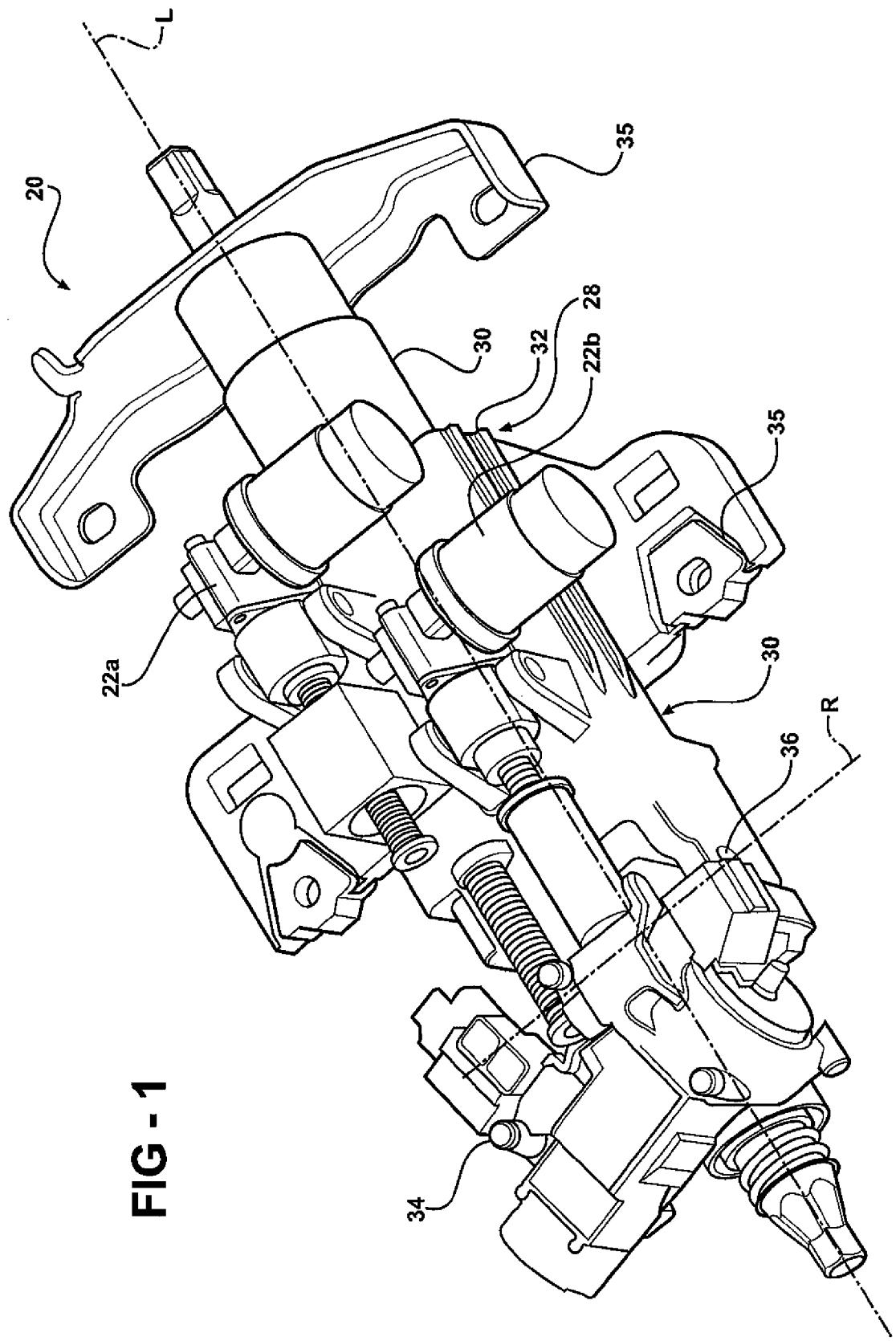
FIG. 1 is a perspective view of a steering column assembly having a power actuator assembly.

Referring to FIG. 1, the steering column assembly 20 is for a vehicle, and supports a steering wheel (not shown) for steering the vehicle. The steering column assembly 20 comprises a column jacket 28. The column jacket 28 includes a lower column jacket 30 and an upper column jacket 32. The upper column jacket 32 is longitudinal movable along a longitudinal axis L relative to the lower column jacket 30 to telescopically adjust the position of the steering wheel. A mounting bracket 35 supports the lower column jacket 30 and mounts the lower column jacket 30 to the vehicle. The upper column jacket 32 includes a pair of rake pins 36, which extend into an upper shaft housing 34 and couples the upper column jacket 32 to the upper shaft housing 34. The rake pin 36 defines a rake axis R, which is transverse to the longitudinal axis L. The upper shaft housing 34 is pivotably movable about the rake axis R to adjust a tilt position of the steering wheel.

The power actuator assembly 22 is coupled to the column jacket 28 for motivating one of the longitudinal movement of the upper jacket 32 along the longitudinal axis L and the pivotable movement of the upper shaft housing 34 about the rake axis R. If the steering column assembly 20 is adjustable in both the telescopic direction along the longitudinal axis L and the tilt direction about the rake axis R, then the actuator assembly 22 preferably includes a first actuator assembly 22a for adjusting the tilt position and a second actuator assembly 22b for adjusting the telescope position. It should be appreciated that the steering column assembly 20 may be adjustable in one or both the telescopic direction and the tilt direction, and may include the actuator assembly 22 for moving the column assembly 20 in one or both the telescopic direction and the tilt direction.

Figure 2:
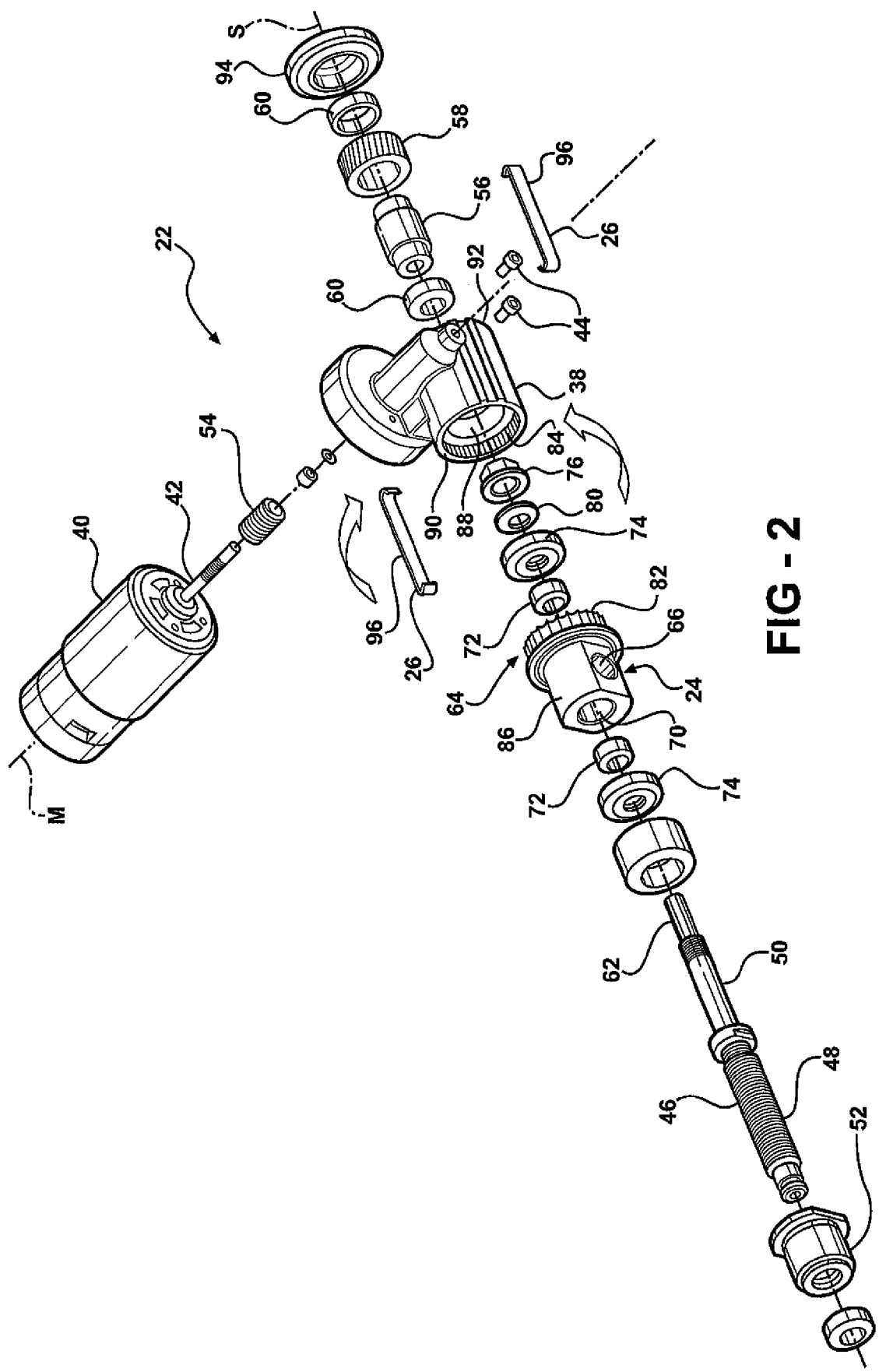
FIG. 2 is an exploded perspective view of the power actuator assembly.

Referring to FIG. 2, the actuator assembly 22 includes a torque transmission device 38. A motor 40 is mounted to the torque transmission device 38. The motor 40 extends along a motor axis M and includes an output shaft 42 rotatable about the motor axis M. Preferably, the motor 40 includes an electric motor 40. However it should be appreciated that the motor 40 may be powered a source of energy other than electricity. The motor 40 is fixedly mounted to the torque transmission device 38. As shown, a pair of motor fasteners 44 extends through the torque transmission device 38 into threaded engagement with the motor 40. It should be appreciated that the motor 40 may be mounted to the torque transmission device 38 in some other manner not shown or described herein.

A screw 46 is coupled to the torque transmission device 38, and extends along a screw axis S. The torque transmission device 38 transfers the rotational movement of the output shaft 42 about the motor axis M to the screw 46 to rotate the screw 46 about the screw axis S. The screw 46 includes a threaded portion 48 and a shank portion 50. The threaded portion 48 of the screw 46 is in threaded engagement with an actuator nut 52. The actuator nut 52 is fixedly attached to the column jacket 28 or the upper shaft housing 34 and advances and retreats along the threaded portion 48 of the screw 46 as the screw 46 rotates clockwise or counterclockwise respectively. Movement of the actuator nut 52 along the threaded portion 48 of the screw 46 moves the column jacket 28 or the upper shaft housing 34 attached to the actuator nut 52 resulting in movement of the column jacket 28 along the longitudinal axis L or the upper shaft housing 34 about the rake axis R.

As shown, the torque transmission device 38 includes a first crossed axis helical gear 54 mounted to the output shaft 42 of the motor 40 for rotation about the motor axis M with the output shaft 42. A gear shaft 56 extends along the screw axis S and is concentric with the screw 46. A second crossed axis helical gear 58 is fixedly mounted to the gear shaft 56. The second crossed axis helical gear 58 is in meshing engagement with the first crossed axis helical gear 54 for rotation about the screw axis S with the gear shaft 56. The screw 46 is coupled to the gear shaft 56 for rotation with the gear shaft 56 about the screw axis S. The gear shaft 56 is rotatably supported in the torque transmission device 38 by a pair of gear shaft bushings 60. The shank portion 50 of the screw 46 includes a keyed end 62 to mate with the gear shaft 56 in interlocking rotational engagement. It should be appreciated that the keyed end 62 of the shank portion 50 of the screw 46 may include splines or some other similar configuration suitable to rotationally interlock the screw 46 and the gear shaft 56 relative to each other. It should also be appreciated that the torque transmission device 38 may be configured other than shown in FIG. 2, and include different components, gears, bushings, etc., and still fall within the scope of the claims. Accordingly, the type and configuration of the torque transmission device 38 may vary from that shown in FIG. 2.

Figure 3A:
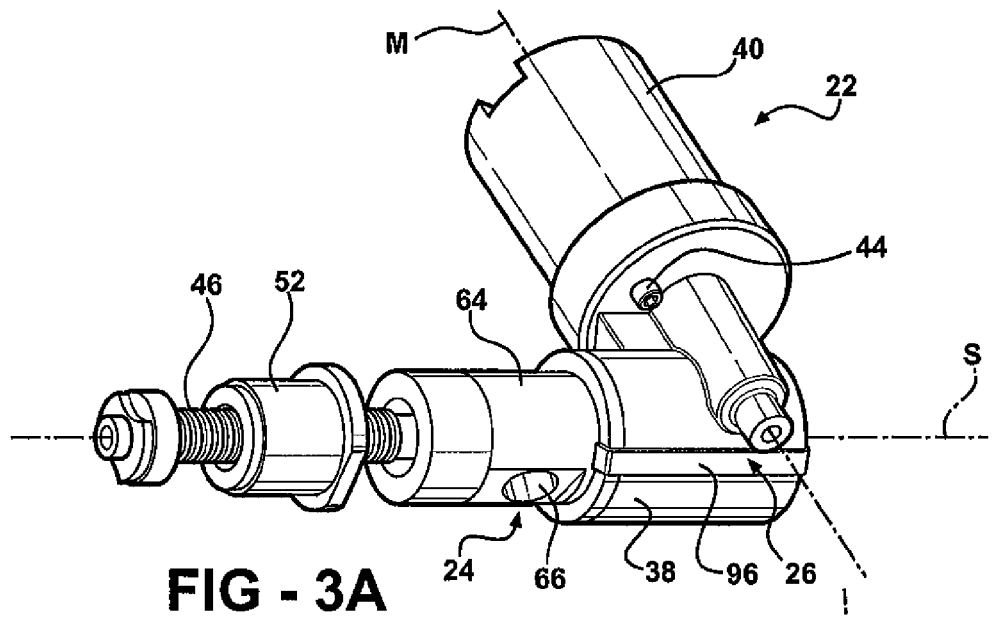
FIG. 3A is a perspective view of the power actuator assembly in a first position.
Figure 3B:
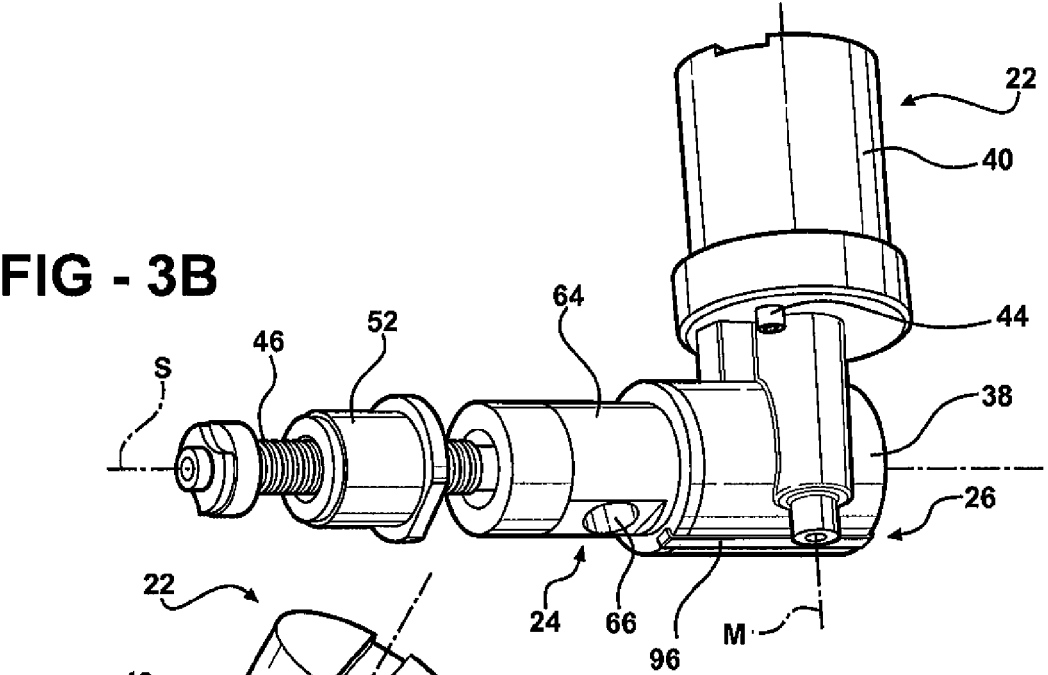
FIG. 3B is a perspective view of the power actuator assembly in a second position.
Figure 3C:
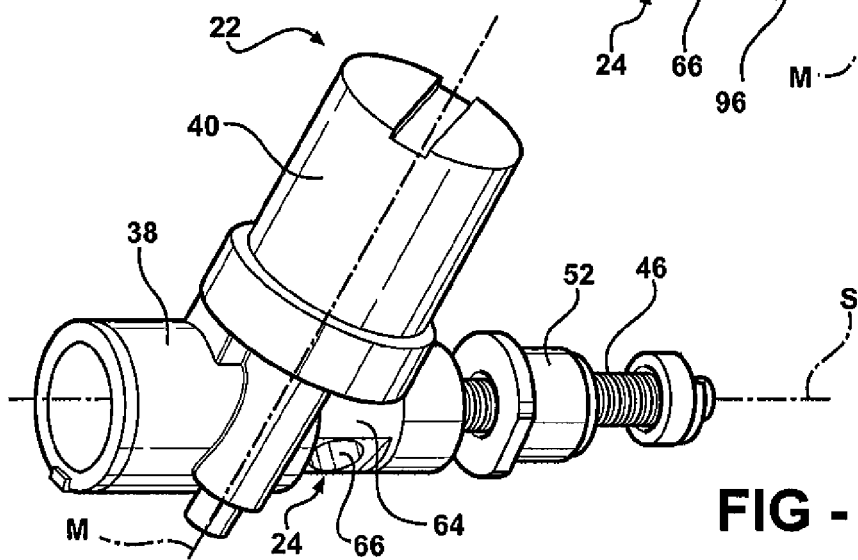
FIG. 3C is a perspective view of the power actuator assembly in a third position.

Referring to FIGS. 3A, 3B and 3C, an adjustment mechanism 64 rotatably supports the screw 46 and interconnects the screw 46 and the torque transmission device 38. The adjustment mechanism 64 permits selective rotational adjustment of the torque transmission device 38 relative to the adjustment mechanism 64 about the screw axis S to reposition the motor 40 relative to the adjustment mechanism 64.

As best shown in FIGS. 3A, 3B and 3C, the adjustment mechanism 64 includes a mounting feature 24 for mounting the adjustment mechanism 64 to a support in a mounted position. The support may include the mounting bracket 34, the lower column jacket 30, a frame member of the vehicle, or some other suitable structure. Preferably, the mounting feature 24 includes at least one aperture 66 defined by the adjustment mechanism 64. As shown, the mounting feature 24 includes a pair of opposing apertures 66 in the adjustment mechanism 64. It should be appreciated that the mounting feature 24 may alternatively include a protrusion or some other similar feature capable of mounting the adjustment mechanism 64 to the support instead of the pair of apertures 66. Accordingly, the adjustment mechanism 64 is mounted to the support in the same relative mounted position. The adjustment mechanism 64 permits the torque transmission device 38 and thereby the motor 40 to be repositioned relative to the mounted position of the adjustment mechanism 64 to fit the various packaging requirements of various vehicles. The mounting feature 24 may include a mounting bearing 68 disposed within the apertures 66 to permit the actuator assembly 22 to pivot as necessary to prevent binding.

Referring back to FIG. 2, the adjustment mechanism 64 defines a central bore 70, through which the shank portion 50 of the screw 46 extends. A pair of screw bushings 72 rotatably supports the shank portion 50 of the screw 46 within the adjustment mechanism 64. A pair of thrust washer bearings 74 is also disposed within the adjustment mechanism 64 and axially supports the shank portion 50 of the screw 46. An attachment nut 76 is in threaded engagement with the screw 46 and fixedly connects the screw 46 to the adjustment mechanism 64 by clamping the adjustment mechanism 64 between the attachment nut 76 and the shank portion 50 of the screw 46. A spring 80 is disposed between the attachment nut 76 and the adjustment mechanism 64 to de-lash the connection between the adjustment mechanism 64 and the screw 46. Preferably, the spring 80 includes a spring 80 washer.

Figure 4A:
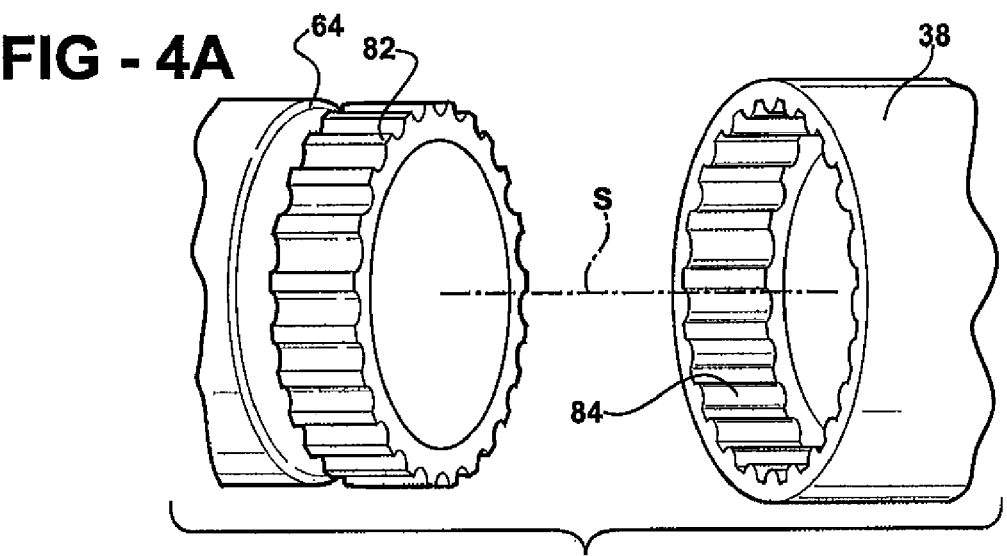
FIG. 4A is an enlarged exploded view of an adjustment mechanism of the power actuator assembly.

Referring to FIG. 4A, the adjustment mechanism 64 further includes at least one groove 82 in one of the adjustment mechanism 64 and the torque transmission device 38. Preferably, the at least one groove 82 includes a plurality of grooves 82. At least one tooth 84 is disposed in another of the adjustment mechanism 64 and the torque transmission device 38. The tooth 84 is in interlocking engagement with one of the plurality of grooves 82 to rotationally fix the adjustment mechanism 64 to the torque transmission device 38. By disposing the tooth 84 in different grooves 82, the torque transmission device 38 is rotated about the screw axis S relative to the adjustment mechanism 64; thereby repositioning the torque transmission device 38 and the motor 40 relative to the adjustment mechanism 64.

Figure 4B:
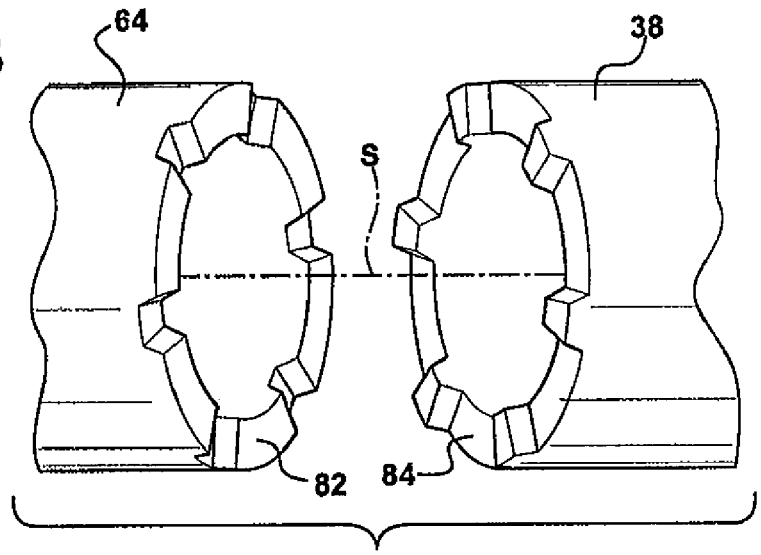
FIG. 4B is an enlarged exploded view of a first alternative embodiment of the adjustment mechanism.
Figure 4C:
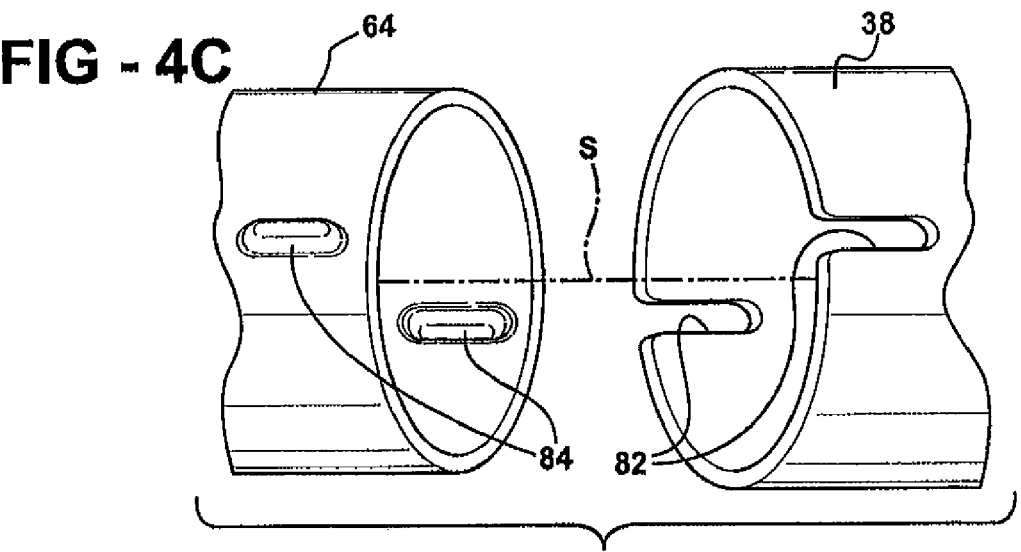
FIG. 4C is an enlarged exploded view of a second alternative embodiment of the adjustment mechanism.

Referring to FIG. 4C, it should be appreciated that the at least one groove 82 may alternatively include at least one slot formed into and extending through the outer surface of one of the adjustment mechanism 64 and the torque transmission device 38, with the at least one tooth 84 disposed in at least one of the plurality of slots. It should also be appreciated that the plurality of grooves 82 may include a plurality of slots. It is contemplated that the teeth 84 may be stamped into one of the adjustment mechanism 64 and the torque transmission device 38 just prior to assembly, thereby truly permitting the motor 40 and the torque transmission device 38 to be positioned anywhere along a three hundred sixty degree)(360°) angle of rotation about the screw axis S relative to the adjustment mechanism 64.

As shown in FIG. 4A, the grooves 82 and the teeth 84 are disposed parallel to the screw axis S. FIG. 4B shows and alternative embodiment of the adjustment mechanism 64, in which the grooves 82 and the teeth 84 are disposed extending radially outward from the screw axis S, and are disposed on opposing planar surfaces of the adjustment mechanism 64 and the torque transmission device 38.

Preferably, the at least one tooth 84 includes a plurality of teeth 84, with the plurality of teeth 84 being equally spaced from each other radially about the screw axis S. Accordingly, it should be appreciated that the plurality of grooves 82 are equally spaced from each other radially about the screw axis S in a corresponding configuration to the plurality of teeth 84 to mate with the plurality of teeth 84. However, it should be appreciated that the plurality of teeth 84 and the plurality of grooves 82 need not be equally spaced about the screw axis S, so long as the teeth 84 and the grooves 82 are arranged in a corresponding fashion relative to each other. Accordingly, if only a single tooth 84 is utilized, the plurality of grooves 82 may be arranged with a first portion of the plurality of grooves 82 equally spaced from all other grooves 82 in the first portion and a second portion of the plurality of grooves 82 equally spaced from all other of the grooves 82 in the second portion, with the second portion rotationally skewed relative to the first portion to increase the adjustability of the adjustment mechanism 64.

Figure 5:
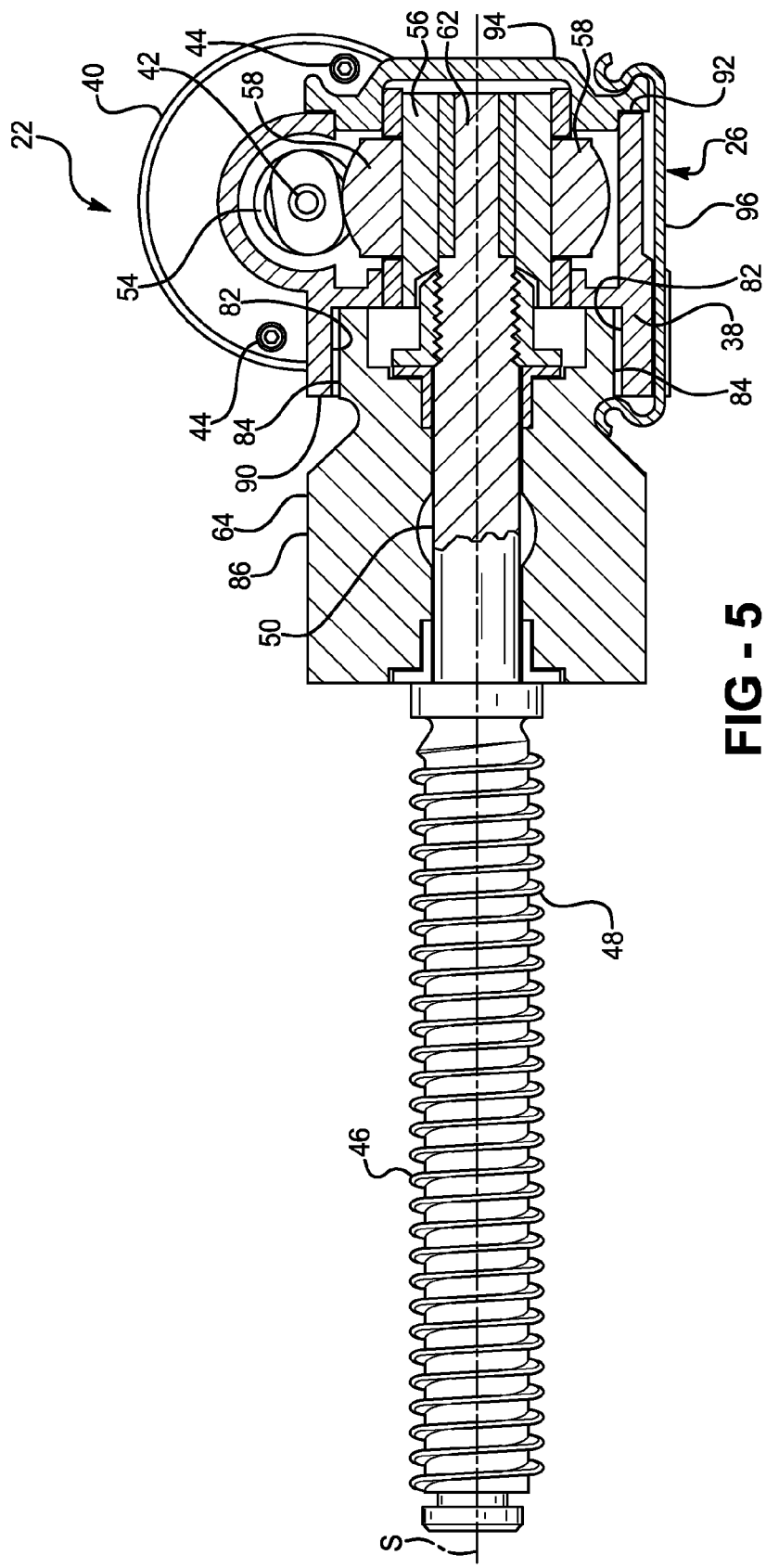
FIG. 5 is a cross sectional view of the power actuator assembly.
Figure 8:
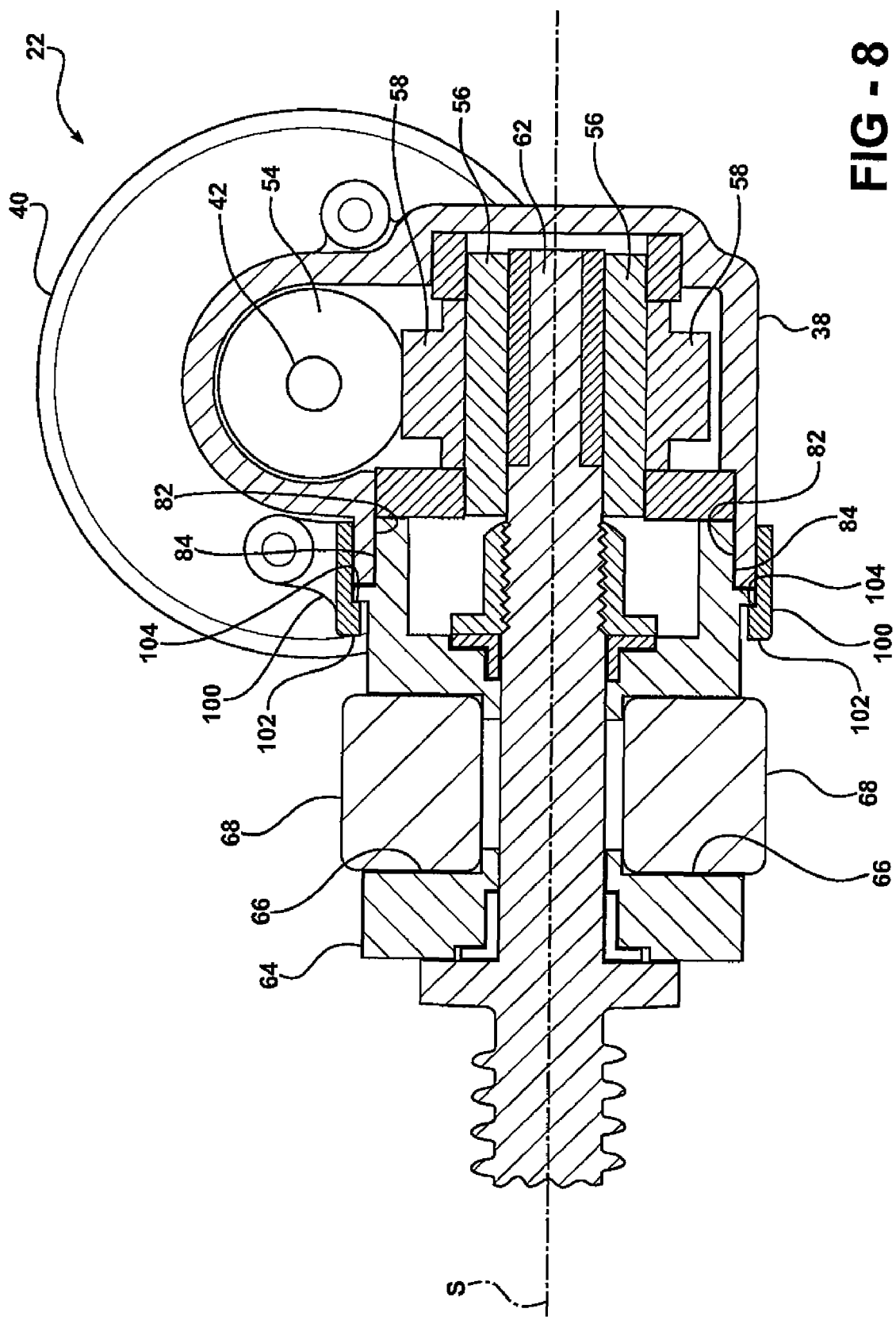
FIG. 8 is a cross sectional view of a third alternative embodiment of the power actuator assembly.

Preferably, one of the adjustment mechanism 64 and the torque transmission device 38 includes an outer surface 86 having an annular shape, with the plurality of grooves 82 disposed on the outer surface 86. Another of the adjustment mechanism 64 and the torque transmission device 38 defines an annular bore 88, with the at least one tooth 84 disposed within the bore and the outer surface 86 partially disposed within the bore. As shown in FIGS. 2, 5 and 8, the adjustment mechanism 64 includes the outer annular surface with the grooves 82 disposed thereon and the torque transmission device 38 defines the annular bore 88 with the teeth 84 disposed therein. However, it should be appreciated that the configuration could be reversed with the torque transmission device 38 defining the outer annular surface with the grooves 82 disposed thereon and the adjustment mechanism 64 defining the annular bore 88 with the teeth 84 disposed therein.

Figure 11:
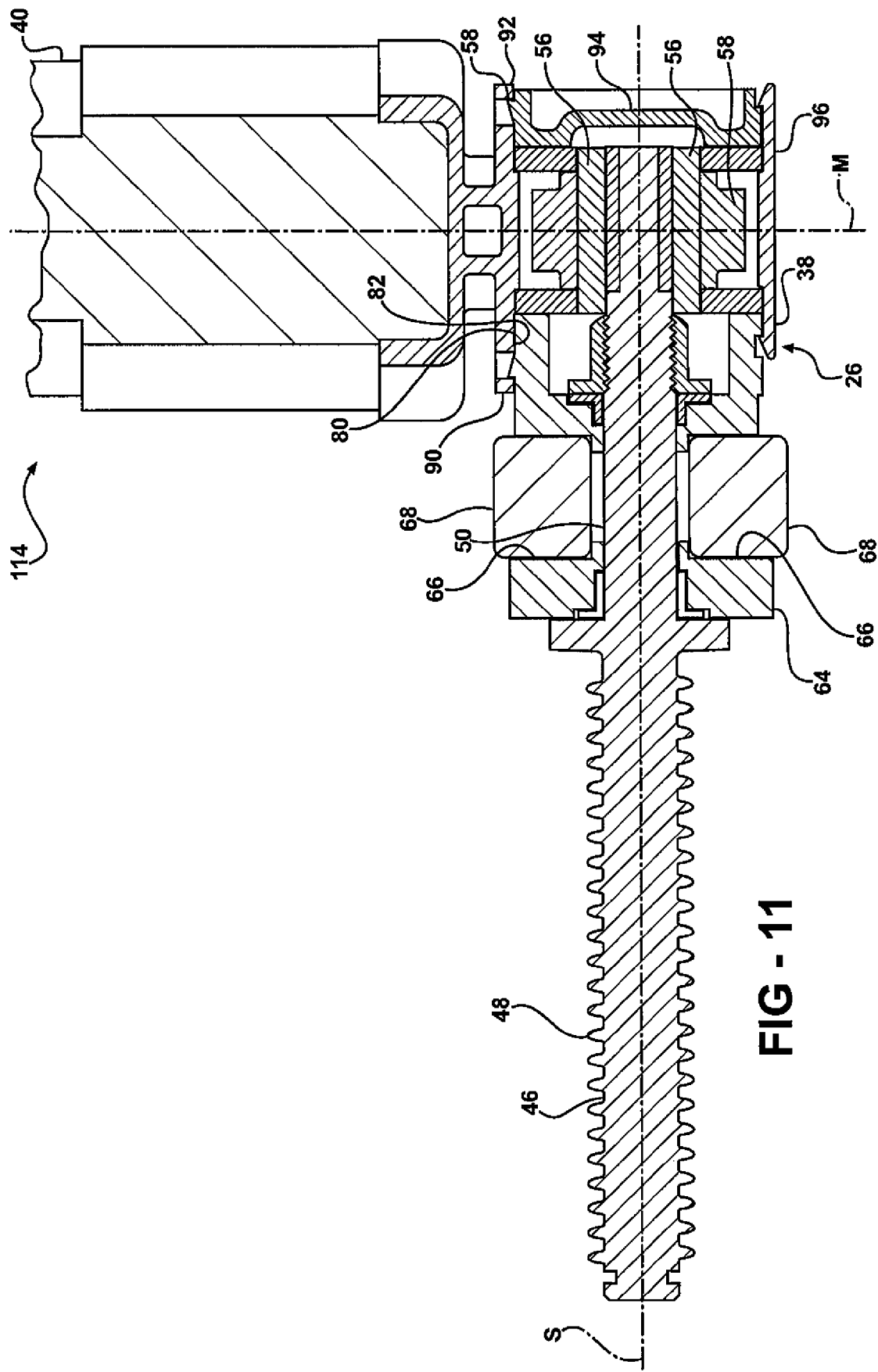
FIG. 11 is a cross sectional view of a sixth alternative embodiment of the power actuator assembly.

As shown in FIGS. 2 and 11, the torque transmission device 38 includes a first end 90 and a second end 92. The adjustment mechanism 64 is in interlocking rotational engagement with the first end 90 of the torque transmission device 38. A cover 94 abuts the second end 92 of the torque transmission device 38 to seal the torque transmission device 38. The cover 94 may be a separate piece or may be integrally formed with the torque transmission device 38.

Referring to FIGS. 2 and 5, the actuator assembly 22 further includes a connection device 26 interconnecting the adjustment mechanism 64 and the torque transmission device 38 together Preferably, the connection device 26 includes an elongated spring clip 96 biasing against both the cover 94 and the adjustment mechanism 64 and clamping the torque transmission device 38 between the adjustment mechanism 64 and the cover 94. However, it should be appreciate that the connection device 26 may include some other device capable of repeatedly connecting and selectively disconnecting the adjustment mechanism 64 and the torque transmission device 38 to permit repeated disassembly and reassembly of the actuator assembly 22. Accordingly, the connection device 26 permits the repeated re-positioning of the torque transmission device 38 and the motor 40 relative to the adjustment mechanism 64 after the actuator 22 has been firstly assembled.

Figure 6:
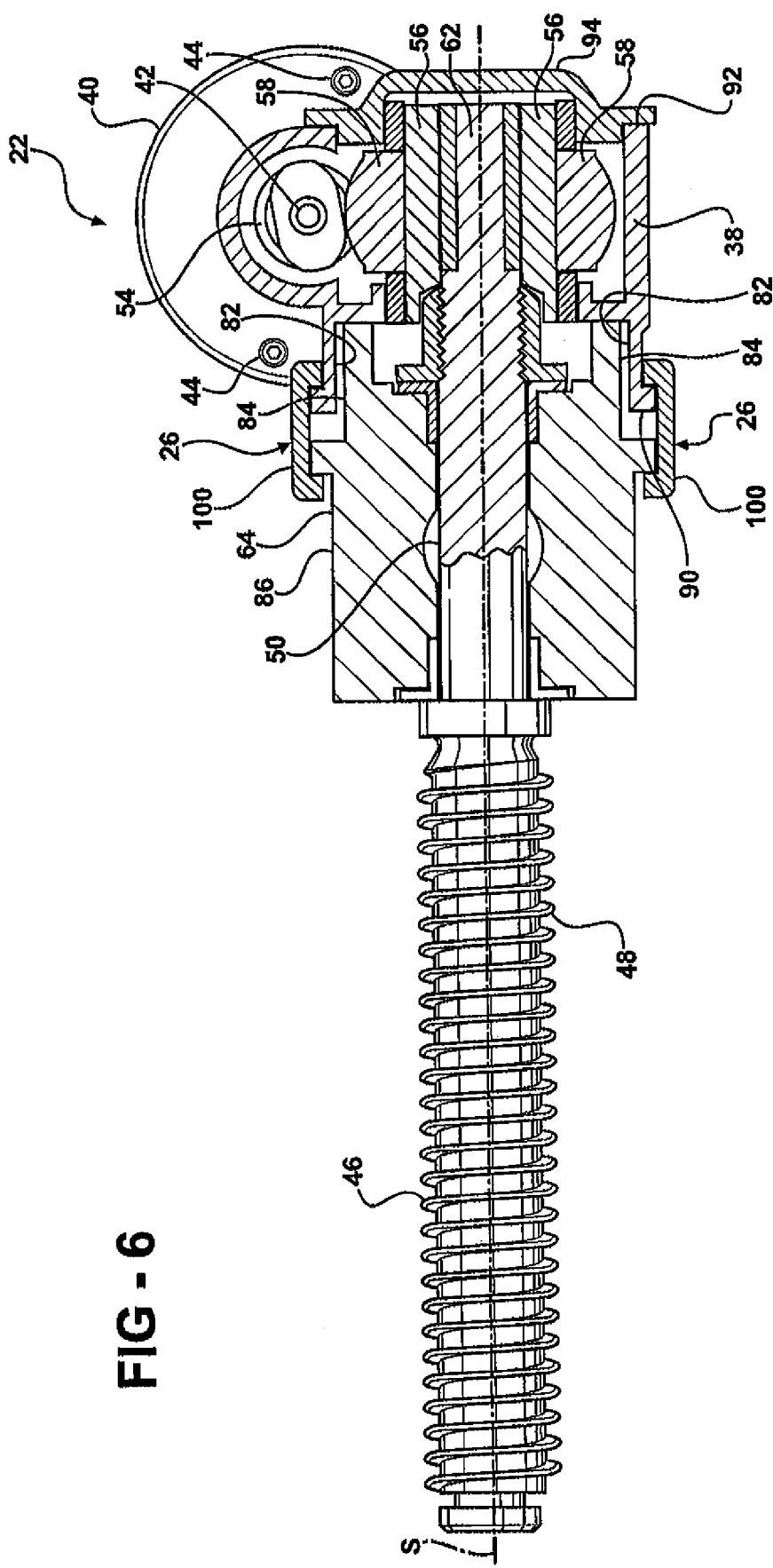
FIG. 6 is a cross sectional view of a first alternative embodiment of the power actuator assembly.
Figure 7:
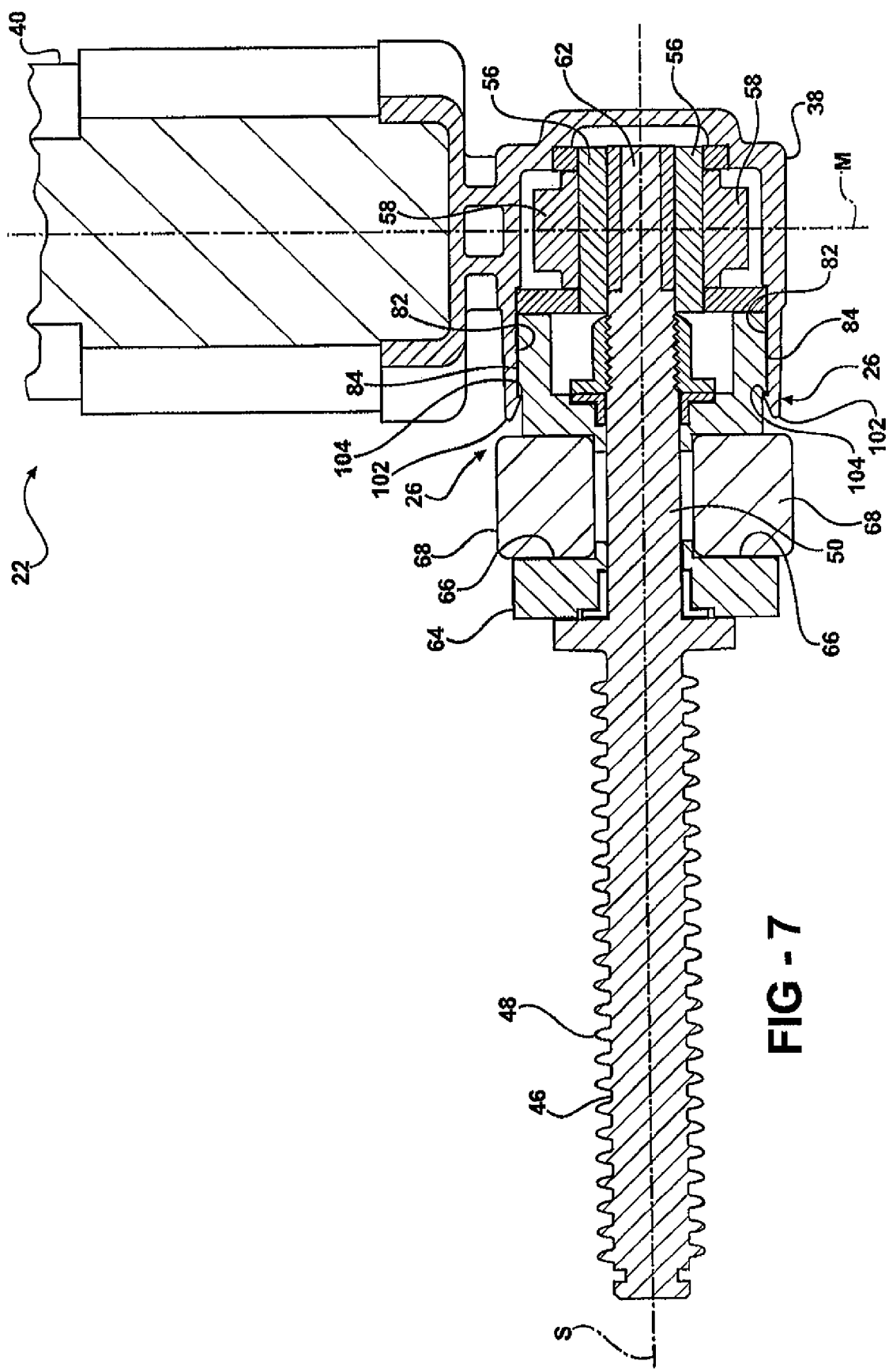
FIG. 7 is a cross sectional view of a second alternative embodiment of the power actuator assembly.
Figure 10:
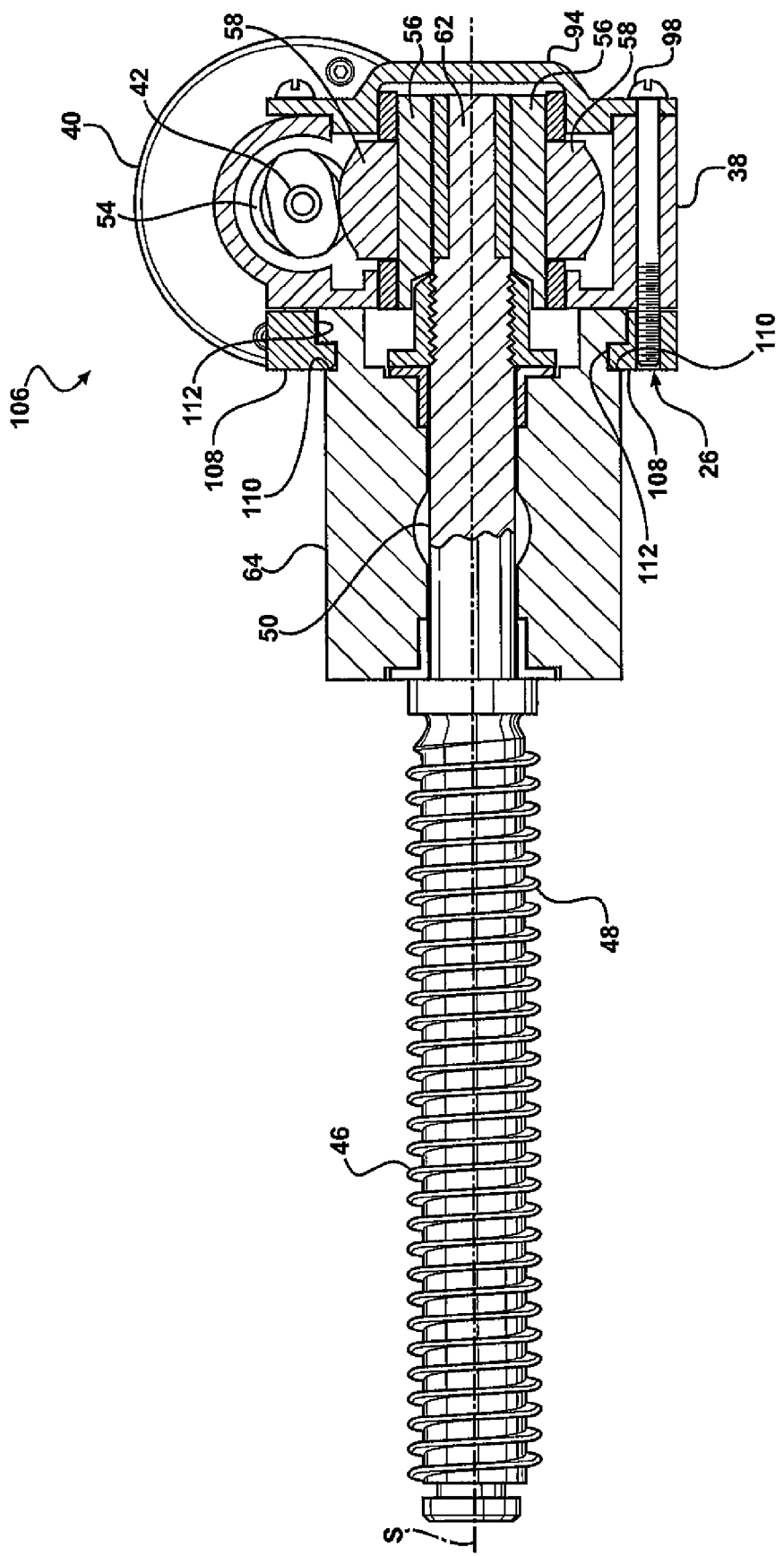
FIG. 10 is a cross sectional view of a fifth alternative embodiment of the power actuator assembly.

Referring to FIG. 10, the connection device 26 may include a connecting fastener 98, such as a screw or bolt. Referring to FIG. 6, the connection device 26 may include a split ring 100 encircling the adjustment mechanism 64 and the torque transmission device 38. Referring to FIG. 8, the connection device 26 may include at least one detent 102 attached to one of the adjustment mechanism 64 and the torque transmission device 38 and a corresponding lip 104 disposed on another of the adjustment mechanism 64 and the torque transmission device 38. As shown, the detents 102 are disposed on the torque transmission device 38 with the lips 104 disposed on the adjustment mechanism 64. However, it should be appreciated that the arrangement may be reversed with the detents 102 disposed on the adjustment mechanism 64 and the torque transmission device 38 including the lip 104.

Figure 9:
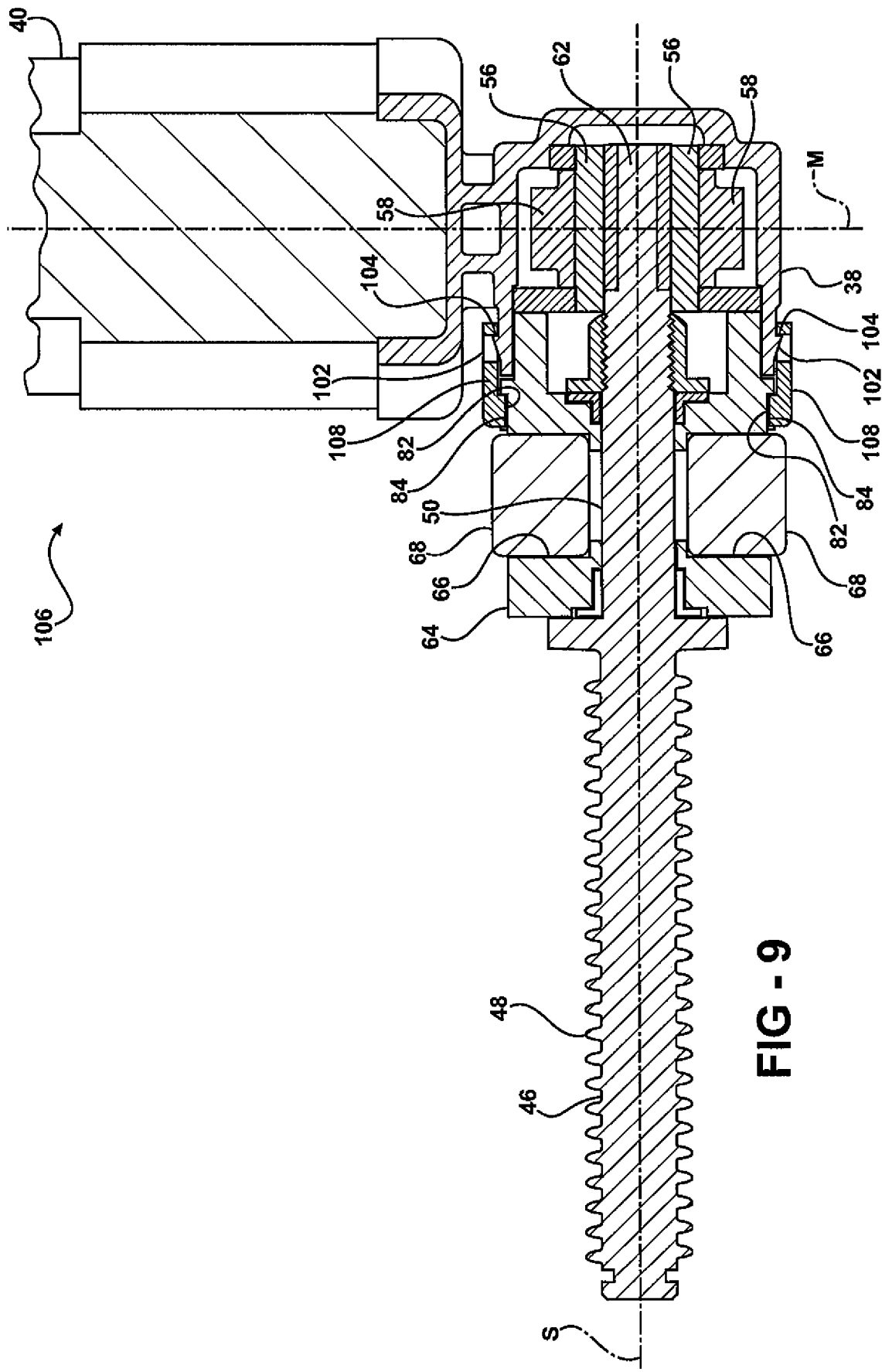
FIG. 9 is a cross sectional view of a fourth alternative embodiment of the power actuator assembly.

Referring to FIGS. 9 and 10, a first alternative embodiment of the actuator assembly is shown generally at 106. In the first alternative embodiment of the actuator assembly 106, the actuator assembly 22 includes a collar 108. One of the adjustment mechanism 64 and the torque transmission device 38 includes an outer surface 86 defining a plurality of recesses 110. The collar 108 is fixedly attached to another of the adjustment mechanism 64 and the torque transmission device 38. The collar 108 includes a plurality of projections 112 engaging the plurality of recesses 110 in interlocking engagement. As shown, the adjustment mechanism 64 includes the outer surface 86 with the recesses 110 therein and the collar 108 is affixed to the torque transmission device 38 and includes the projections 112 for engaging the recesses 110. It should be appreciated that this configuration may be reversed with the torque transmission device 38 defining the outer surface 86 and recesses 110 thereon and the collar 108 attached to the adjustment mechanism 64 and including the projections 112. It should also be appreciated that in the first alternative embodiment, the collar 108 may also function as the connection device 26 to interconnect the adjustment mechanism 64 and the torque transmission device 38.

Referring to FIG. 11, a second alternative embodiment of the actuator assembly is shown generally at 114. In the second alternative embodiment, the torque transmission device 38 is configured to mate with the adjustment mechanism 64 at either the first end 90 or the second end 92 of the torque transmission device 38. Assuming the torque transmission device 38 defines the annular bore 88 with the teeth 84 disposed therein, each of the first end 90 and the second end 92 of the torque transmission device 38 include the teeth 84 to mate with the grooves 82 on the outer surface 86 of the adjustment mechanism 64. Likewise, the gear shaft 56 is also configured to mate with the keyed end 62 of the screw 46 through either the first end 90 or the second end 92 of the torque transmission device 38. The cover 94 is likewise adapted to fit either the first end 90 or the second end 92 of the torque transmission device 38. Accordingly the second alternative embodiment of the actuator assembly 114 provides even more versatility.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A power actuator assembly comprising:
a torque transmission device;
a motor mounted to said torque transmission device and extending along a motor axis and having an output shaft rotatable about said motor axis;
a screw coupled to said torque transmission device and extending along a screw axis with said torque transmission device transferring said rotational movement of said output shaft about said motor axis to said screw to rotate said screw about said screw axis;
an adjustment mechanism rotatably supporting said screw and interconnecting said screw and said torque transmission device and permitting selective rotational adjustment of said torque transmission device relative to said adjustment mechanism about said screw axis to reposition said motor relative to said adjustment mechanism.

2. A power actuator assembly as set forth in claim 1 further comprising at least one groove in one of said adjustment mechanism and said torque transmission device and at least one tooth in another of said adjustment mechanism and said torque transmission device in interlocking engagement with one of said at least one groove.

3. A power actuator assembly as set forth in claim 1 wherein said at least one groove includes a plurality of grooves.

4. A power actuator assembly as set forth in claim 3 wherein said plurality of grooves and said plurality of teeth extend parallel to said screw axis.

5. A power actuator assembly as set forth in claim 4 wherein one of said adjustment mechanism and said torque transmission device includes an outer surface having an annular shape and said plurality of grooves are disposed on said outer surface and wherein another of said adjustment mechanism and said torque transmission device defines an annular bore and said at least one tooth is disposed within said bore with said outer surface partially disposed within said bore.

6. A power actuator assembly as set forth in claim 5 wherein said at least one tooth includes a plurality of teeth.

7. A power actuator assembly as set forth in claim 2 wherein said at least one groove and said plurality of teeth extend radially outward from said screw axis.

8. A power actuator assembly as set forth in claim 2 wherein said at least one groove includes at least one slot extending through an outer surface of one of said adjustment mechanism and said torque transmission device.

9. A power actuator assembly as set forth in claim 1 further comprising a collar and wherein one of said adjustment mechanism and said torque transmission device include an outer surface defining a plurality of recesses with said collar fixedly attached to another of said adjustment mechanism and said torque transmission device and including a plurality of projections engaging said plurality of recesses in interlocking engagement.

10. A power actuator assembly as set forth in claim 1 further comprising a connection device interconnecting said adjustment mechanism and said torque transmission device together.

11. A power actuator assembly as set forth in claim 10 wherein said connection device includes one of a group comprising an elongated spring clip, at least one fastener, and a split ring encircling said adjustment mechanism and said torque transmission device.

12. A power actuator assembly as set forth in claim 10 wherein said connection device includes at least one detent attached to one of said adjustment mechanism and said gear box and a lip disposed on another of said adjustment mechanism and said torque transmission device.

13. A power actuator assembly as set forth in claim 1 wherein said adjustment mechanism includes a mounting feature for mounting said adjustment mechanism to a support in a mounted position.

14. A power actuator assembly as set forth in claim 13 wherein said mounting feature includes at least one aperture defined by said adjustment mechanism.

15. A power actuator assembly comprising:
a torque transmission device having a first end and a second end;
a motor mounted to said torque transmission device and extending along a motor axis and having an output shaft rotatable about said motor axis;
a screw coupled to said torque transmission device and extending along a screw axis with said torque transmission device transferring said rotational movement of said output shaft about said motor axis to said screw to rotate said screw about said screw axis;
an adjustment mechanism rotatable supporting said screw and interconnecting said screw and said torque transmission device and permitting selective rotational adjustment of said torque transmission device relative to said adjustment mechanism about said screw axis to reposition said motor relative to said adjustment mechanism, said first end for receiving said adjustment mechanism and said second end for receiving said adjustment mechanism with said adjustment mechanism coupled to either of said first end or said second end; and
a cover mounted to another of said first end and said second end to seal said torque transmission device.

16. A steering column assembly for a vehicle, said steering column assembly comprising:
a column jacket having a lower jacket and a upper jacket longitudinal movable along a longitudinal axis relative to said lower jacket;
an upper shaft housing supporting said column jacket and defining a rake axis with said column jacket pivotably movable about said rake axis;
an actuator coupled to said upper shaft housing for motivating one of said longitudinal movement of said upper jacket along said longitudinal axis and said pivotable movement of said upper shaft housing about said rake axis, said actuator including:
a torque transmission device;
a motor mounted to said torque transmission device and extending along a motor axis and having an output shaft rotatable about said motor axis;
a screw coupled to said torque transmission device and extending along a screw axis with said torque transmission device transferring said rotational movement of said output shaft about said motor axis to said screw to rotate said screw about said screw axis;
an adjustment mechanism rotatably supporting said screw and interconnecting said screw and said torque transmission device and permitting selective rotational adjustment of said torque transmission device relative to said adjustment mechanism about said screw axis to reposition said motor relative to said adjustment mechanism.

17. An steering column assembly as set forth in claim 16 wherein said actuator further includes a plurality of grooves in one of said adjustment mechanism and said torque transmission device and at least one tooth in another of said adjustment mechanism and said torque transmission device in interlocking engagement with one of said plurality of grooves.

18. A steering column assembly as set forth in claim 17 wherein said actuator further includes a connection device interconnecting said adjustment mechanism and said torque transmission device together.

19. A steering column assembly as set forth in claim 18 wherein said torque transmission device includes a first crossed axis helical gear mounted to said output shaft of said motor for rotation about said motor axis and a gear shaft extending along said screw axis and a second crossed axis helical gear fixedly mounted to said gear shaft in meshing engagement with said first crossed axis helical gear for rotation about said screw axis with said gear shaft, with said screw coupled to said gear shaft for rotation with said gear shaft.

20. A steering column assembly as set forth in claim 18 wherein said torque transmission device includes a first end for receiving said adjustment mechanism and a second end for receiving said adjustment mechanism with said adjustment mechanism coupled to either of said first end or said second end and wherein said assembly further comprises a cover mounted to another of said first end and said second end to seal said torque transmission device.

* * * * *